(12) United States Patent
Lindén et al.

(10) Patent No.: US 8,458,912 B2
(45) Date of Patent: Jun. 11, 2013

(54) CUTTING TOOL

(75) Inventors: Olavi Lindén, Billnäs (FI); Markus Paloheimo, Karjaa (FI)

(73) Assignee: Fiskars Brands Finland Oy AB, Billnas (FI)

(*) Notice: Subject to any disclaimer, the term of this patent is extended or adjusted under 35 U.S.C. 154(b) by 573 days.

(21) Appl. No.: 12/542,536

(22) Filed: Aug. 17, 2009

(65) Prior Publication Data
US 2010/0043238 A1    Feb. 25, 2010

(30) Foreign Application Priority Data

Aug. 19, 2008 (FI) .................................... 20085779

(51) Int. Cl.
*B26B 13/26* (2006.01)
(52) U.S. Cl.
USPC ............................................. 30/131; 30/251
(58) Field of Classification Search
USPC ................... 30/145, 146, 173, 175, 177, 184, 30/185, 28, 251, 131
See application file for complete search history.

(56) References Cited

U.S. PATENT DOCUMENTS

| | | |
|---|---|---|
| 107,577 A | 9/1870 | Will |
| 132,044 A | 10/1872 | Bacher |
| 157,610 A | 12/1874 | King |
| 476,459 A | 6/1892 | Hammann et al. |
| 573,548 A | 12/1896 | Sours |
| 640,257 A | 1/1900 | Baer |
| 764,430 A | 7/1904 | Crosby |
| 823,367 A | 6/1906 | Ryan |
| 863,111 A | 8/1907 | Smohl |
| 993,646 A | 5/1911 | Burkett |
| 1,065,753 A | 6/1913 | Whitney |
| 1,066,675 A | 7/1913 | Stowell |
| 1,097,773 A | 5/1914 | Sawin |
| 1,168,125 A | 1/1916 | Stowell |

(Continued)

FOREIGN PATENT DOCUMENTS

| | | |
|---|---|---|
| CN | 2392365 Y | 8/2000 |
| DE | 900 90 7 | 1/1954 |

(Continued)

OTHER PUBLICATIONS

European Search Report for 09167978.7; dated Feb. 23, 2011, 6 pages.

(Continued)

*Primary Examiner* — Sean Michalski
(74) *Attorney, Agent, or Firm* — Foley & Lardner LLP

(57) ABSTRACT

A cutting tool includes a first lever having a first end and a second end, the first end being connected to a second elongated element in an articulated manner at a third pivot point and the second end being arranged to engage with a tongue in a metal plate to transmit force from the second elongated element to a first blade in the metal plate so as to perform a cutting movement with a cutting jaw when the first and the second elongated elements are shifted towards one another. The cutting tool also comprises an engagement device provided in the tongue and arranged to receive the second end of the lever optionally at two or more engagement points with respect to the first pivot point so as to perform stepwise cutting movements. The engagement points are placed in the tongue successively away from the third pivot point.

20 Claims, 6 Drawing Sheets

U.S. PATENT DOCUMENTS

| | | |
|---|---|---|
| 1,395,758 A | 11/1921 | Maszczyk |
| 1,429,792 A | 9/1922 | Stiriss |
| 1,455,297 A | 5/1923 | Lyons et al. |
| 1,502,191 A | 7/1924 | Helwig |
| 1,520,529 A | 12/1924 | Cagle |
| 1,533,039 A | 4/1925 | Shirk |
| 1,689,648 A | 10/1928 | Voleske |
| 1,760,627 A | 5/1930 | Bernard |
| 1,771,031 A | 7/1930 | Court |
| 1,897,532 A | 2/1933 | Pilcher |
| 1,915,404 A | 6/1933 | Clifton |
| 2,516,946 A | 8/1950 | Barone |
| 2,520,905 A | 9/1950 | Borrelli |
| 2,520,908 A | 9/1950 | Carson et al. |
| 2,528,816 A | 11/1950 | Boyer |
| 2,557,506 A | 6/1951 | Kovacevich |
| 2,674,796 A | 4/1954 | Herold |
| 2,769,237 A | 11/1956 | Oxhandler |
| 2,993,275 A | 7/1961 | Naito |
| 3,372,478 A | 3/1968 | Wallace et el. |
| 3,390,455 A | 7/1968 | Florian |
| 3,760,500 A | 9/1973 | Eads et al. |
| 3,851,389 A | 12/1974 | Swanson |
| 4,031,621 A | 6/1977 | Arlett |
| 4,046,148 A | 9/1977 | Meador |
| 4,094,064 A * | 6/1978 | Nishikawa et al. ............... 30/92 |
| 4,130,938 A | 12/1978 | Uhlmann |
| 4,176,450 A * | 12/1979 | Muromoto ...................... 30/92 |
| 4,178,682 A * | 12/1979 | Sadauskas ..................... 30/250 |
| 4,528,707 A | 7/1985 | Aida |
| 4,599,795 A | 7/1986 | Yokoyama |
| 4,677,748 A | 7/1987 | Kobayashi |
| D301,537 S | 6/1989 | Pittaway |
| D301,538 S | 6/1989 | Pittaway |
| D305,090 S | 12/1989 | Collins et al. |
| 4,947,553 A | 8/1990 | Bendickson et al. |
| 4,964,216 A | 10/1990 | Gosselin |
| 5,020,222 A | 6/1991 | Gosselin et al. |
| 5,058,277 A | 10/1991 | Kishimoto |
| 5,079,801 A | 1/1992 | Peterson |
| 5,084,975 A | 2/1992 | Melter |
| D336,222 S | 6/1993 | Wensley et al. |
| D336,412 S | 6/1993 | Wensley et al. |
| D336,835 S | 6/1993 | Lutzke |
| 5,241,752 A | 9/1993 | Lutzke et al. |
| 5,255,438 A | 10/1993 | Morgan |
| D342,652 S | 12/1993 | Wensley et al. |
| 5,267,400 A | 12/1993 | Danube et al. |
| D343,773 S | 2/1994 | Lutzke |
| D347,771 S | 6/1994 | Lutzke |
| 5,367,774 A | 11/1994 | Labarre et al. |
| D354,890 S | 1/1995 | Concari et al. |
| D359,427 S | 6/1995 | Birkholz |
| 5,426,857 A | 6/1995 | Lindén |
| D359,890 S | 7/1995 | Wensley |
| D361,700 S | 8/1995 | Birkholz |
| D362,162 S | 9/1995 | Wensley |
| 5,469,625 A | 11/1995 | Melter et al. |
| 5,511,314 A | 4/1996 | Huang |
| D369,531 S | 5/1996 | Birkholz |
| 5,570,510 A | 11/1996 | Lindén |
| D377,588 S | 1/1997 | Birkholz |
| 5,590,470 A * | 1/1997 | Erbrick et al. .................. 30/250 |
| 5,592,743 A | 1/1997 | Labarre et al. |
| 5,636,443 A | 6/1997 | Lindén |
| 5,689,888 A | 11/1997 | Linden |
| D387,647 S | 12/1997 | Lindén |
| 5,697,159 A | 12/1997 | Lindén |
| D393,193 S | 4/1998 | Schneider et al. |
| 5,761,815 A | 6/1998 | Lin |
| 5,933,965 A | 8/1999 | Lindén et al. |
| 5,950,315 A | 9/1999 | Lindén |
| 5,974,670 A | 11/1999 | Hsieh |
| 6,101,725 A | 8/2000 | Lindén |
| 6,105,257 A | 8/2000 | Rutkowski et al. |
| 6,161,291 A | 12/2000 | DiMatteo et al. |
| 6,199,284 B1 | 3/2001 | Nilsson et al. |
| 6,202,310 B1 | 3/2001 | Lindén |
| 6,345,446 B1 | 2/2002 | Huang |
| 6,418,626 B1 | 7/2002 | Jang |
| 6,493,943 B1 | 12/2002 | Linden |
| 6,513,248 B2 | 2/2003 | Linden et al. |
| 6,640,442 B2 * | 11/2003 | Lin .................................. 30/251 |
| 6,711,820 B2 | 3/2004 | Chen |
| 6,748,663 B2 | 6/2004 | Lindén |
| 6,785,969 B2 | 9/2004 | Wang |
| 6,789,324 B2 | 9/2004 | Linden et al. |
| 6,829,828 B1 | 12/2004 | Cech et al. |
| 6,829,829 B1 | 12/2004 | Huang |
| D501,379 S | 2/2005 | Lipscomb et al. |
| D503,595 S | 4/2005 | Lipscomb et al. |
| 6,935,031 B1 | 8/2005 | Huang |
| 6,938,346 B1 | 9/2005 | Huang |
| 7,080,455 B1 | 7/2006 | Ronan et al. |
| 7,127,819 B1 | 10/2006 | Huang |
| D576,011 S | 9/2008 | Lipscomb et al. |
| 7,530,172 B1 | 5/2009 | Wu |
| 7,681,318 B2 | 3/2010 | Hsieh |
| D621,234 S | 8/2010 | Goetz et al. |
| 2001/0005941 A1 | 7/2001 | DiMatteo et al. |
| 2002/0000044 A1 | 1/2002 | Huang |
| 2002/0046466 A1 | 4/2002 | Deville |
| 2002/0066188 A1 | 6/2002 | Wu |
| 2003/0014868 A1 | 1/2003 | Cech et al. |
| 2003/0136008 A1 | 7/2003 | Lin |
| 2004/0064954 A1 | 4/2004 | Schmidt |
| 2005/0172499 A1 | 8/2005 | Huang |
| 2006/0156554 A1 | 7/2006 | Lin |
| 2006/0277764 A1 | 12/2006 | Hsien |
| 2007/0079512 A1* | 4/2007 | Nelson et al. ................ 30/123.3 |
| 2008/0052916 A1 | 3/2008 | Lin |
| 2008/0155835 A1 | 7/2008 | Lin |
| 2008/0276464 A1 | 11/2008 | Hatch |
| 2008/0282549 A1 | 11/2008 | Lin |
| 2009/0044412 A1 | 2/2009 | Hsieh |
| 2009/0313835 A1* | 12/2009 | Erbrick ......................... 30/251 |
| 2010/0043237 A1 | 2/2010 | Linden et al. |
| 2010/0043238 A1 | 2/2010 | Linden et al. |
| 2010/0162575 A1 | 7/2010 | Lin |
| 2010/0199502 A1 | 8/2010 | Linden et al. |
| 2011/0154668 A1 | 6/2011 | Liu et al. |
| 2011/0283545 A1 | 11/2011 | Wu |
| 2012/0047750 A1* | 3/2012 | Maag et al. .................... 30/251 |

FOREIGN PATENT DOCUMENTS

| | | |
|---|---|---|
| DE | 1272 84 9 | 7/1968 |
| EP | 0 747 181 | 12/1996 |
| EP | 1 153 713 | 11/2001 |
| EP | 1 166 620 | 1/2002 |
| EP | 1 625 784 B1 | 2/2006 |
| EP | 2 156 730 | 2/2010 |
| EP | 2 156 731 | 2/2010 |
| FR | 2 825 573 A3 | 12/2002 |
| GB | 605038 A | 7/1948 |
| GB | 2 375 500 B | 3/2004 |
| GB | 2 468 665 | 9/2010 |
| JP | 08-331979 | 12/1996 |
| JP | 11-057243 | 3/1999 |
| JP | 2002-066168 | 3/2002 |
| WO | WO-90/00464 | 1/1990 |
| WO | WO 2007/128879 A1 | 11/2007 |

OTHER PUBLICATIONS

U.S. Appl. No. 12/600,819, filed May 20, 2008, Linden et al.
U.S. Appl. No. 12/542,517, filed Aug. 17, 2009, Linden et al.
U.S. Appl. No. 12/300,099, filed May 8, 2007, Linden et al.
First Chinese Office Action for Application No. 200910168065.6, dated Sep. 27, 2012, 11 pages.

* cited by examiner

CUTTING TOOL

CROSS REFERENCE TO RELATED APPLICATIONS

The present Application claims the benefit of priority of Finnish patent application No. 20085779 titled "Cutting Tool" filed on Aug. 19, 2008, the disclosure of which is hereby incorporated by reference in its entirety.

FIELD

The invention relates to a cutting tool, and more particularly to a cutting tool having a metal plate with a first pivot point and a first blade extending forwardly from the first pivot point and a tongue extending backwardly, and a first elongated element which comprises a first handle and which comprises at its distal end an anvil or a second blade, which is arranged to form a cutting jaw with the blade, and a second pivot point and which first elongated element is connected to the metal plate in an articulated manner at the first pivot point. More particularly a second elongated element includes a second handle and a third pivot point and which second elongated element is connected to the first elongated element in an articulated manner at the second pivot point. More particularly a first lever includes a first end and a second end, the first end being connected in an articulated manner to the second elongated element at the third pivot point and the second end being arranged to engage with a tongue of the metal plate so as to transmit force from the second elongated element to the first blade to perform a cutting movement with the cutting jaw as the first and the second elongated elements are shifted towards one another. More particularly, an engagement device is provided in the tongue, which receives the second end of the first lever optionally at two or more engagement points in relation to the first pivot point so as to perform stepwise cutting movements.

BACKGROUND

In various manually operated cutting tools for cutting branches or similar objects to be cut it is generally known to utilize a mechanism that allows stepwise cutting of the object to be cut. The mechanisms are arranged to work such that when an object to be cut, having a first diameter or thickness, is placed in the cutting jaw of the cutting tool the cutting is performed with one cutting movement. Whereas, when an object to be cut, having a second diameter or thickness that is larger than the first diameter or thickness, is placed in the cutting jaw of the cutting tool, the cutting of the object takes place stepwise with two or more successive cutting movements, whereby each cutting movement cuts a portion of the diameter or thickness of the object to be cut.

Cutting tools of this kind generally include a first and a second elongated elements, which further include a first and a second handles, whose relative turning movement allows the cutting jaw of the cutting tool to be set in a closed and an open position. These cutting tools generally also comprise an immobile blade, e.g. an anvil, and a movable blade that moves in response to the relative movement of the first and the second handles. The first or the second of the handles is further connected operationally to a blade with a lever mechanism for force transmission. The first end of the lever in the lever mechanism is thus connected to the first or the second elongated element in an articulated manner at a pivot point. The movable blade is further provided with two or more engagement points wherewith the second end of the lever optionally engages in order to enable stepwise cutting as presented above. An example of a solution of this kind is set forth in US Pat. No. 4,094,064.

A problem with the above arrangement is that in these known cutting mechanisms the lever and the engagement points are implemented such that the cutting force exerted on the blade by means of the relative movement of the handles is not transmitted to the blade in an optimal manner, but force is lost, whereby in all cutting steps there is not an equal amount of force available. In that case, in the known solutions engagement points, wherewith the second end of the lever engages, are placed substantially successively away from the pivot point about which the moving blade rotates during the cutting movement. In other words, the engagement points are placed on a line extending substantially radially away from the pivot point about which the moving blade rotates. In that case, all engagement points are significantly at different distances from the pivot point about which the lever turns the moving blade, whereby a good lever position is not achieved in all engagement points, but in at least some of the engagement points the lever is in a disadvantageous position for transmitting force to the blade, whereby cutting becomes cumbersome and more force must be exerted on the handles. In addition, in these known tools that enable stepwise cutting, more force is required at the beginning of each cutting movement than at the end.

It would be desirable to provide a cutting tool such that the above-mentioned problems will be solved. It would also be desirable to provide a cutting tool in which the engagement points are placed in the tongue successively away from the third pivot point. In other words, the engagement points are placed substantially successively away from the third pivot point at the end of each stepwise cutting movement. The engagement points are thus placed in the tongue successively on a line extending substantially parallel to a first lever at the end of each cutting movement, or extending substantially radially in relation to the third pivot point at the end of the cutting movement, or extending transversely in relation to a line extending radially from the first pivot point towards the engagement points or some of the engagement points. The above-mentioned line, on which the engagement points are placed, may be a straight line, or the line may form an arc that curves around the first pivot point. In other words, the concave side of the arc faces the first pivot point. The engagement points may further be placed in the tongue such that an angle between the line extending through the engagement point closest to the third pivot point and the furthest engagement point and the line extending through the first pivot point and the engagement point closest to the third pivot point is preferably at most 125 degrees at the end of the cutting movement defined by each engagement point. Further, the engagement points may be placed in the tongue such that an angle between the line extending through two adjacent or successive engagement points and the line extending through the first pivot point and the engagement point closest to the third pivot point of the successive engagement points is preferably at most 125 degrees at the end of each cutting movement. In the most preferred case the engagement points are provided substantially at the same distance from the first pivot point, i.e. the lever arm is the same in each engagement point.

According to the embodiment illustrated herein, one advantage is that the engagement points are placed such that the cutting force exerted on the first blade by means of the relative movement of the elongated elements is as good as possible at each cutting stage defined by the engagement points. The distance of each engagement point from the pivot point defines the lever arm, by means of which the blade is rotated about the first pivot point. In accordance with the illustrated embodiment, this lever arm is rendered as good as possible and/or substantially the same at each engagement point. The greatest force for carrying out the cutting operation is required when the second end of the first lever is engaged with the engagement point closest to the third pivot point, whereby the object to be cut with a cutting movement is cut off completely as the cutting jaw closes, such that the first blade and the anvil set substantially against one another. By means of the solution of the invention the cutting force and the above-mentioned lever arm will be good also at the engagement point closing the cutting jaw completely. In other words, the cutting tool is able to optimize the cutting force as a whole between the engagement points and thus the cutting will be as easy as possible. In addition, the force needed in each cutting movement is considerably more equal from the beginning to the end than in known tools.

SUMMARY

According to one embodiment, a cutting tool includes a metal plate having a first pivot point and a first blade extending forwardly from the first pivot point and a tongue extending backwardly. A first elongated element includes a first handle and at its distal end an anvil or a second blade that is arranged to form with the first blade a cutting jaw, and a second pivot point, where the first elongated element is connected in an articulated manner to the metal plate at the first pivot point. A second elongated element includes a second handle and a third pivot point, the second elongated element being connected in an articulated manner to the first elongated element at the second pivot point. A first lever includes a first end and a second end, the first end being connected in an articulated manner to the second elongated element at the third pivot point and the second end being arranged to engage with the tongue of the metal plate so as to transmit force from the second elongated element to the first blade for performing a cutting movement with the cutting jaw when the first and the second elongated elements are shifted towards one another. An engagement device is provided in the tongue, the engagement device being arranged to receive the second end of the first lever optionally at two or more engagement points in relation to the first pivot point in order to perform stepwise cutting movements, wherein the engagement points are placed in the tongue successively away from the third pivot point.

According to another embodiment, a cutting tool includes a metal plate with a first pivot point and a first cutting element extending forwardly from the first pivot point and a tongue extending backwardly. A first elongated element has a first handle and at its distal end a second cutting element that is arranged to form with the first cutting element a cutting jaw, and a second pivot point, the first elongated element coupled to the metal plate at the first pivot point. A second elongated element has a second handle and a third pivot point, the second elongated element coupled to the first elongated element at the second pivot point. A first lever includes a first end and a second end, the first end being coupled to the second elongated element at the third pivot point and the second end being arranged to engage with the tongue of the metal plate so as to transmit force from the second elongated element to the first blade. A plurality of spaced engagement points are provided in the tongue, the engagement points being arranged to receive the second end of the first lever in order to perform stepwise cutting movements.

BRIEF DESCRIPTION OF THE DRAWINGS

In the following embodiments, the invention will be described in greater detail in connection with exemplary embodiments, with reference to the attached drawings, in which.

DETAILED DESCRIPTION

Referring to FIGS. 1 to 6, a cutting tool is shown in accordance with an exemplary embodiment of the present invention. The cutting tool comprises a metal plate 2 comprising a first pivot point 4 and a first blade 6 extending forwardly from the first pivot point 4 and a tongue 8 extending backwardly. At the first pivot point 4, the metal plate 2 is provided with a hole through which a joint pin may be inserted. The metal plate 2 thus forms a moving blade of the cutting tool, which moving blade is arranged to rotate about the first pivot point 4.

Figure 1:
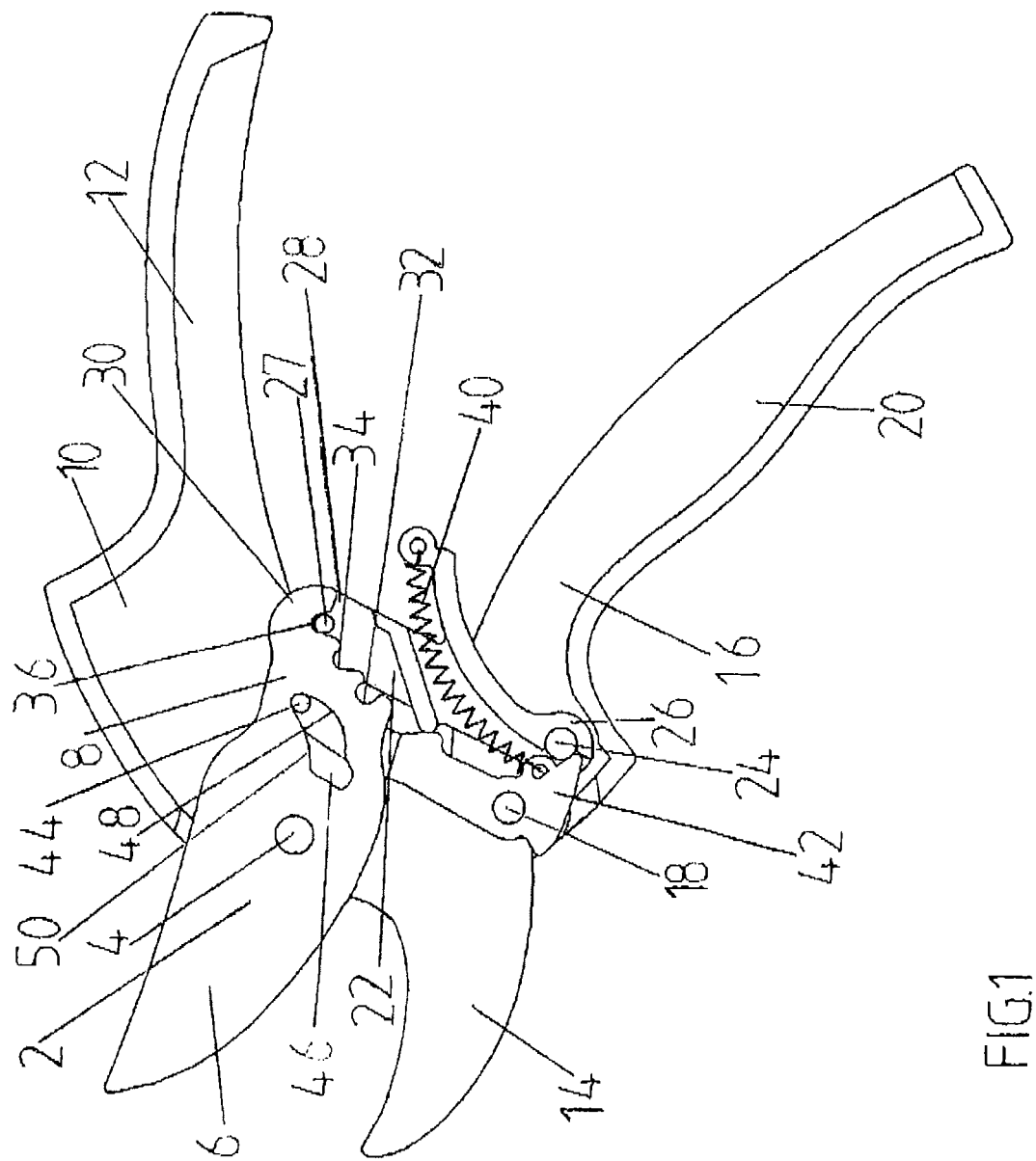
FIG. 1 shows a cutting tool in a first open position according to an exemplary embodiment.

In accordance with FIG. 1, the cutting tool comprises a first elongated element 10 comprising a first handle 12. The first elongated element 10 comprises at its distal end an anvil 14 or a second blade that is arranged to form a cutting jaw with the first blade 6. The second blade or anvil 14 is provided integrally at the distal end of the first elongated element 10 or connected fixedly thereto. In other words, in the cutting tool the second blade or anvil 14 is fixed and the cutting jaw is opened and closed by means of a moving first blade 6. In order to open and close the cutting jaw during the cutting movement the first elongated element 10 is connected in an articulated manner to the metal plate 2 at the first pivot point 4, The first elongated element 10 also comprises a second pivot point 18, at which the first elongated element 10 is provided with a hole for receiving a joint pin. In accordance with FIG. 1, the second pivot point 18 is provided close to the second blade or anvil 14. At the second pivot point 18 a second elongated element 16 is connected to the first elongated element 10 in an articulated manner such that it is rotatable about the second pivot point 18 in relation to the first elongated element 10. The second elongated element 16 also comprises a second handle 20, whereby the cutting movement of the cutting tool may be carried out by moving the first and the second handles 12, 20 towards one another and they rotate in relation to one another about the second pivot point 18 turning the metal plate 4 further about the first pivot point 4 for performing the cutting movement.

In the second elongated element 16 there is further provided a third pivot point 24 that is arranged away from and at a distance from the second pivot point 18 on the side of the second handle 20 as shown in FIG. 1. In the third pivot point 24 there is connected a first lever 22 having a first end 26 and a second end 28. The first end 26 of the first lever 22 is connected in an articulated manner at the third pivot point 24 to the second elongated element 16 such that the first lever 22 is able to turn in relation to the second elongated element 16. The second end 28 of the first lever 22 is arranged to engage with the metal plate 4 and in particular with the tongue 8 thereof in order to transmit force from the second elongated element 16 to the first blade 6 for carrying out a cutting movement with the cutting jaw as the first and the second elongated elements 10, 16 are moved towards one another. In other words, the first lever 22 transmits the force exerted on the first and second elongated elements 10, 16 to the metal plate 4 and to the first blade 6. The second end 28 of the first lever 22 is engaged to the tongue 8 by means of an engagement device 30. The engagement device 30 is arranged to receive the second end 28 of the first lever 22 optionally at two or more engagement points 32, 34, 36 in relation to the first pivot point 4. The engagement points 32, 34, 36 are provided such that they enable performance of stepwise cutting movements with the cutting tool.

Figure 2:
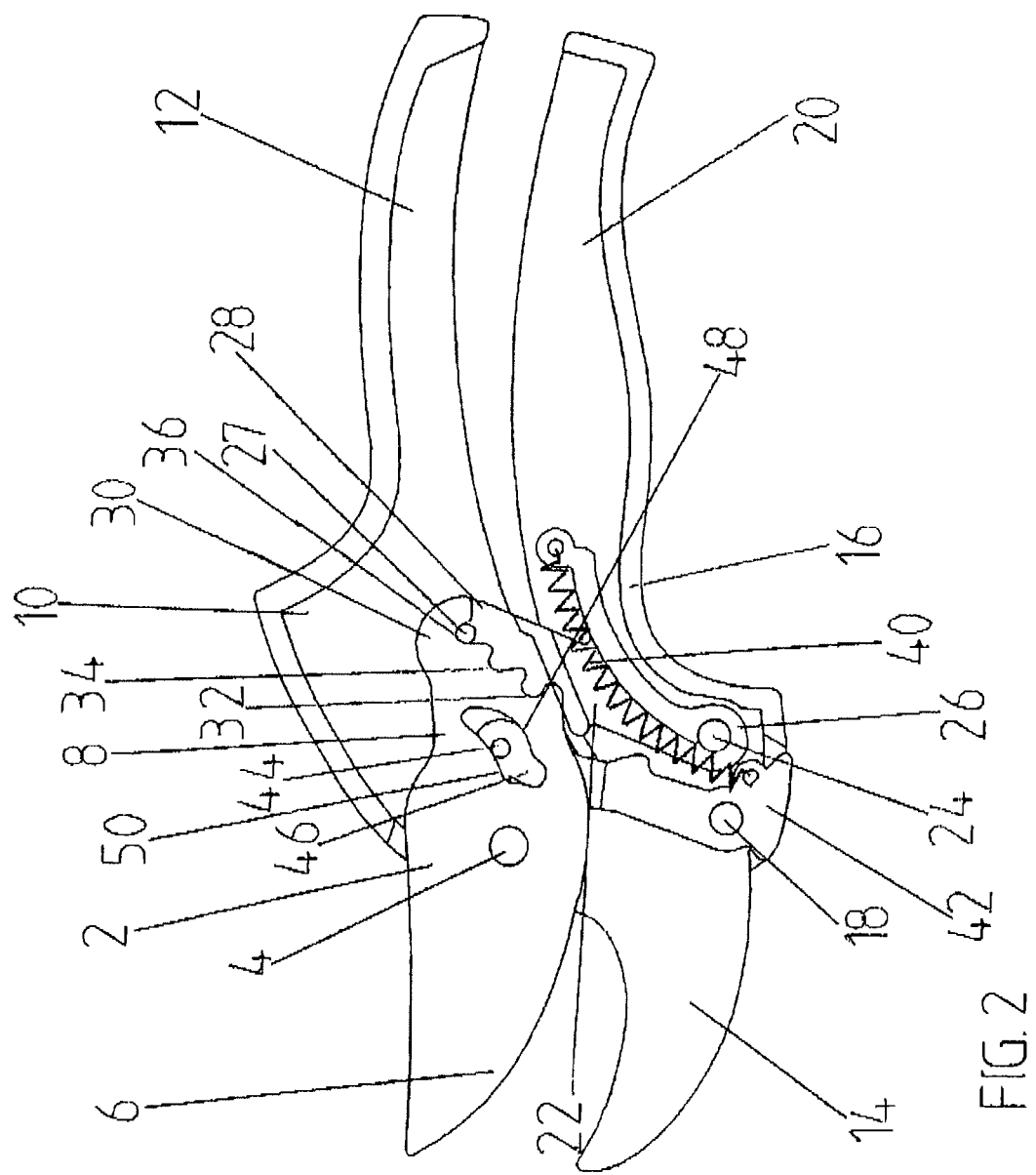
FIG. 2 shows the cutting tool of FIG. 1 in a first closed position.
Figure 4:
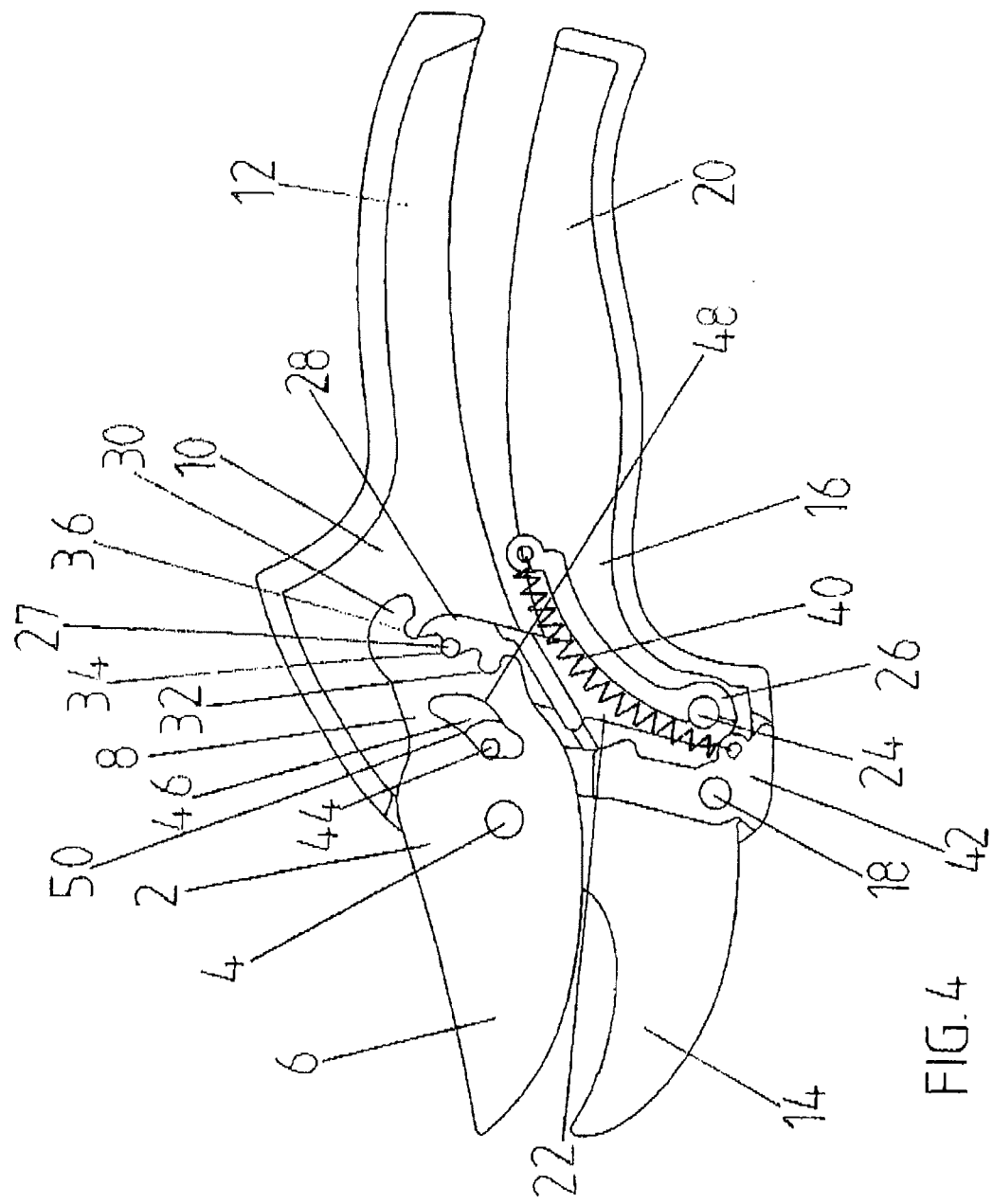
FIG. 4 shows the cutting tool of FIG. 1 in a second closed position.

In accordance with FIG. 1, the engagement points 32, 34, 36 are notches, recesses or the like provided in the tongue 8. The second end 28 of the first lever 22 is further provided with a first pin 27 that is arranged to engage optionally with engagement points 32, 34, 36 so as to carry out step-wise cutting movements. The engagement points 32, 34, 36 are arranged in the tongue 8 such that in accordance with FIG. 6 they are at different distances from the third pivot point 24 in the closed position of the cutting jaw so as to enable stepwise cutting movements. In other words, the engagement points 32, 34, 36 are provided in the tongue such that when the second end 28 of the first lever 22 is engaged with the engagement point 32 closest to the third pivot point the cutting jaw is completely closed at the end of the cutting movement such that the first blade 6 and the anvil 14 set substantially against one another. Whereas, when the second end 28 of the first lever 22 is engaged with the engagement point 34 second closest to the third pivot point 24 the cutting jaw will be only partly closed at the end of the cutting movement such that there will be a gap between the first blade 6 and the anvil 14 as shown in FIG. 4. Further, when the second end 28 of the first lever 22 is engaged with the engagement point 36 third closest to the third pivot point 24 the cutting jaw is only partly closed at the end of the cutting movement such that between the blade 6 and the anvil 14 there will be a gap, as shown in FIG. 2, that will be larger than the one appearing when the second end 28 is engaged with an engagement point 34 closer to the third pivot point. In other words, a cutting movement associated with each particular engagement point 32, 34, 36 cuts a portion of the diameter or thickness of the object to be cut.

In accordance with the illustrated embodiment, the engagement points 32, 34, 36, which may be two or more in the tongue, are placed such that the cutting force exerted on the first blade 6 by means of the relative movements of the elongated elements 10, 16 is as good as possible at each cutting stage defined by the engagement points 32, 34, 36. The distance of each engagement point 32, 34, 36 from the first pivot point 4 defines the lever arm, by means of which the blade 6 is rotated about the first pivot point 4. Thus, in accordance with the illustrated embodiment, the lever arm should be as good as possible at each engagement point 32, 34, 36. The greatest force for performing the cutting is often required when the second end 28 of the first lever 22 is engaged with the engagement point 32 closest to the third pivot point 24, whereby the object to be cut with the cutting movement will be cut off completely as the cutting jaw is closed such that the first blade 6 and the anvil 14 are set substantially against one another.

Figure 6:
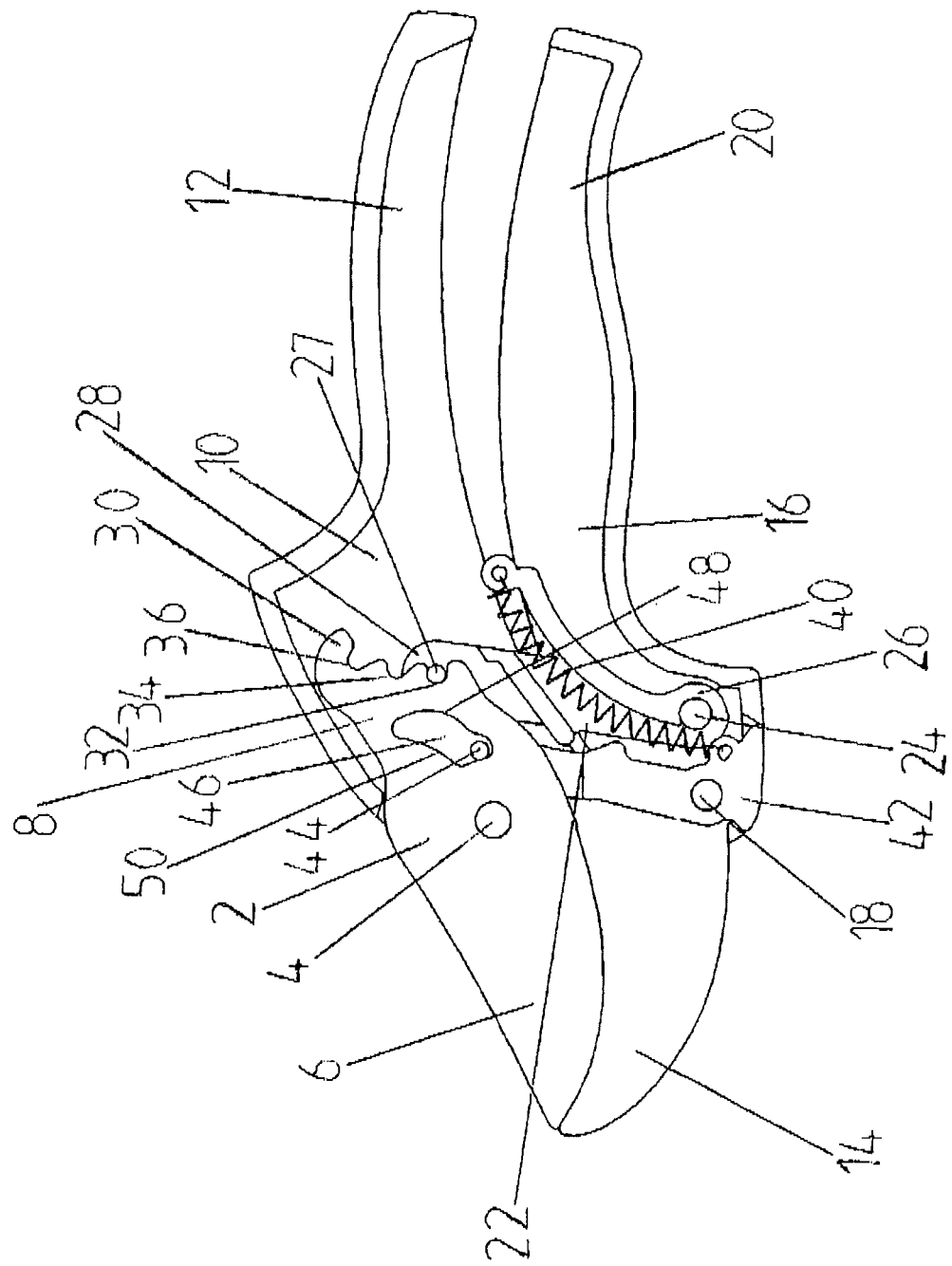
FIG. 6 shows the cutting tool of FIG. 1 in a third closed position.

In order to transmit force and to optimize the above mentioned lever arm between the engagement points, the engagement points 32, 34, 36 are placed in the tongue 8 successively away from the third pivot point 24. In other words, as shown in FIGS. 2, 4 and 6, the engagement points 32, 34 36 are placed substantially successively away from the third pivot point 24 at the end of each stepwise cutting movement. The engagement points 32, 34, 36 are thus placed in the tongue 8 successively on a line extending substantially in the direction of the first lever 22 at the end of each cutting movement, or extending substantially radially in relation to the third pivot point 24 at the end of the cutting movement, or extending transversely in relation to the line extending from the first pivot point 4 radially towards the engagement points or some of the engagement points 34, 36, 38. The abovementioned line, on which the engagement points 32, 34, 36 are placed, may be a straight line or the line may form an arc, which curves around the first pivot point 4. In other words, the concave side of the arc faces the first pivot point 4. The engagement points 32, 34, 36 may further be placed in the tongue 8 such that an angle between the line extending through the closest engagement point 32 and the furthest engagement point 36 to the third pivot point 24 and the line extending through the first pivot point 4 and the engagement point 32 closest to the third pivot point 24 is at most approximately 125 degrees at the end of the cutting movement defined by each engagement point 32, 34, 36. Further, the engagement points 32, 34, 36 may be placed in the tongue 8 such that an angle between the line extending through two adjacent or successive engagement points 32, 34, 36 and the line extending through the first pivot point 4 and the engagement point 32, 34 closer to the third pivot point 24 of the adjacent engagement points 32, 34, 36 is at most approximately 125 degrees at the end of each cutting movement. In the most preferred embodiment, the engagement points 32, 34, 36 are provided substantially at the same distance from the first pivot point, i.e. the lever arm is the same in each engagement point 32, 34, 36.

In accordance with FIG. 1, the engagement points are notches 32, 34, 36 that are arranged to receive optionally a first pin 27 at the second end 28 of the first lever 22 to engage the lever 22 with the metal plate 4 and to transmit force from the second elongated element 16 to the first blade 6. In the exemplary embodiment described herein, the engagement points 32, 34, 36 are provided on the edge of the tongue 8 in the metal plate 2 and in particular on the lower edge. Alternatively, it is possible to provide in the metal plate 4 an aperture or a slot (not shown) through which the first pin 27 at the second end 28 of the first lever 22 is inserted and on the edge of which aperture there are provided engagement points 32, 34, 36.

Because the engagement points 32, 34, 36 are provided substantially successively away from the third pivot point 24 and/or successively in parallel with the first lever 22, the pin 27 is not able to move easily from one engagement point to another as can be seen in FIGS. 1 to 6. Therefore, when necessary it is possible to provide in the cutting tool control devices 42, 44, 46 for engaging the second end 28 of the first lever 22 automatically each time with the engagement point 32, 34, 36 that corresponds to the diameter or thickness of the object to be cut with each cutting movement. The control devices 42, 44, 46 are arranged to control the position of the metal plate 2 such that the first pin 27 at the second end 28 of the first lever 22 will engage with the engagement point 32, 34, 36 that corresponds to the diameter or thickness of the object to be cut with each cutting movement. The control devices 42, 44, 46 comprise a second lever 42 having a first end and a second end, the first end of the second lever being connected to the first elongated element 16 in an articulated manner at a second pivot point 18 and the second end of the second lever 42 being engaged with the metal plate 2. The control devices 42, 44, 46 further comprise a second pin 44 at the second end of the second lever 42 and an aperture 46 in the metal plate 2, through which aperture the second pin 44 is inserted so as to control the position of the metal plate 2. The aperture 46 comprises a rear surface 48 which is spiral in relation to the first pivot point 4, or curves towards the first pivot point 4, and with which the second pin 44 engages in order to control the metal plate 2 as the cutting jaw opens. The aperture 46 also comprises a front surface 50 which is spiral in relation to the first pivot point 4, or curves towards the first pivot point 4, and with which the second pin 44 engages in order to control the metal plate 2 as the cutting jaw closes. Thus, the second pin 44 is pressed against the front surface 50 of the aperture 46 when the cutting jaw is closed, controlling the metal plate 2 such that the first pin 27 remains in the engagement point 32, 34, 36 which corresponds the diameter or thickness of the object to be cut. Correspondingly, the second pin 44 is pressed against the rear surface 48 of the aperture 46 when the cutting jaw is opened, controlling the metal plate 2 such that the first pin 27 will rest in the engagement point 32, 34, 36 which corresponds to the diameter or thickness of the object to be cut.

The cutting tool also comprises a spring device 40 for pretensioning the first and the second handles 12, 20 and the cutting jaw to an open position. The spring device 40 is provided such that with the first and second handles 12, 20 in the open position, pretensioned with the spring device, the second end 28 of the lever 22 engages with the engagement point 32 closest to the third pivot point 24. The spring device 40 comprises a spiral spring, as shown in FIG. 1, which is connected between the first lever 22 and the second lever 42, or between the first lever 22 and the second elongated element 16, or between the first lever 22 and the first elongated element 10.

Figure 5:
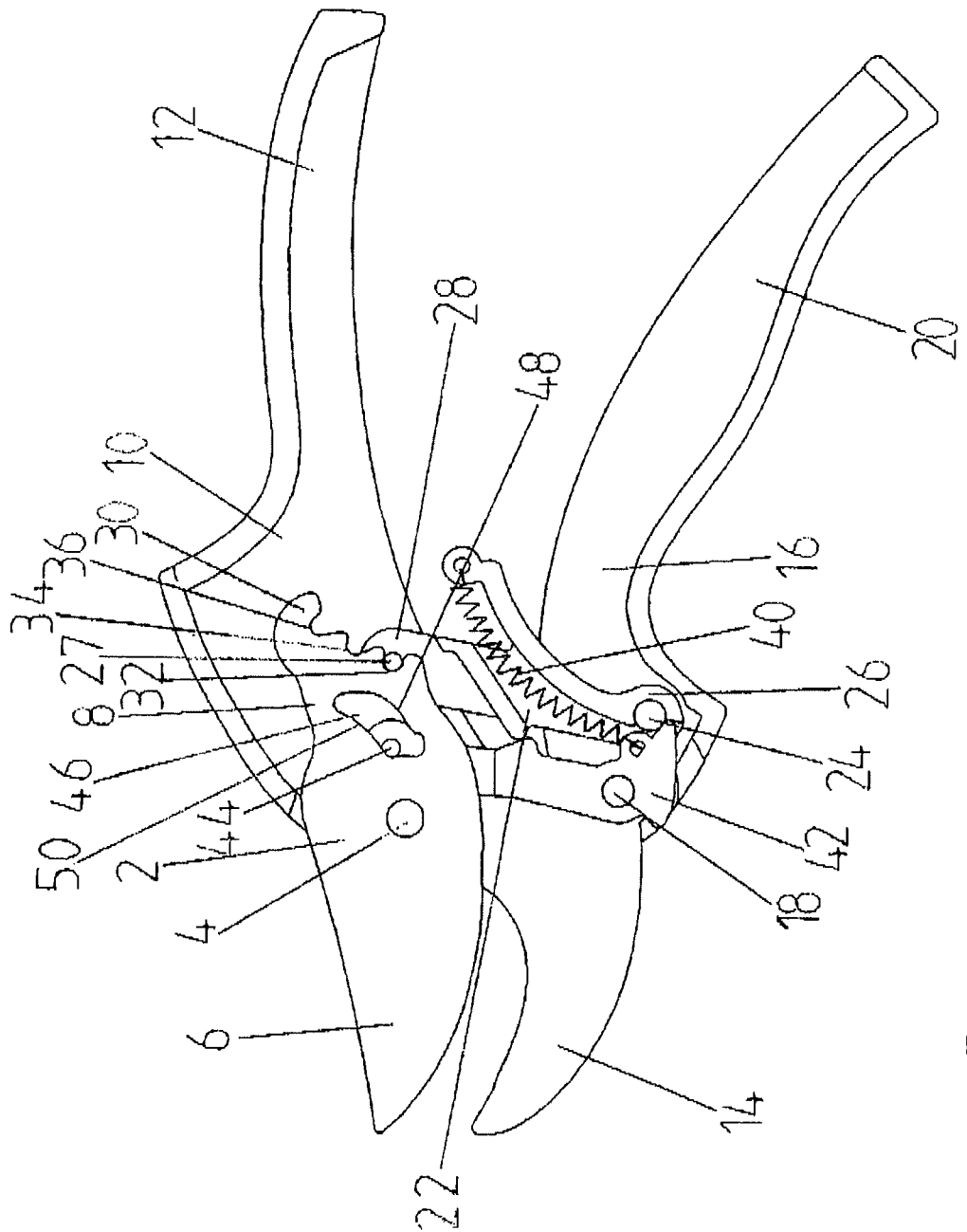
FIG. 5 shows the cutting tool of FIG. 1 in a third open position.

The cutting tool of the illustrated embodiment is arranged to operate such that when one object having a first thickness or diameter is being cut the second end 28 of the lever 22 engages with the engagement point 32 closest to the third pivot point 24 so as to perform a cutting movement as shown in FIG. 5. Thereafter, performance of the cutting movement cuts off completely the object to be cut, when the first blade 6 and the anvil 14 set substantially against one another as shown in FIG. 6.

Figure 3:
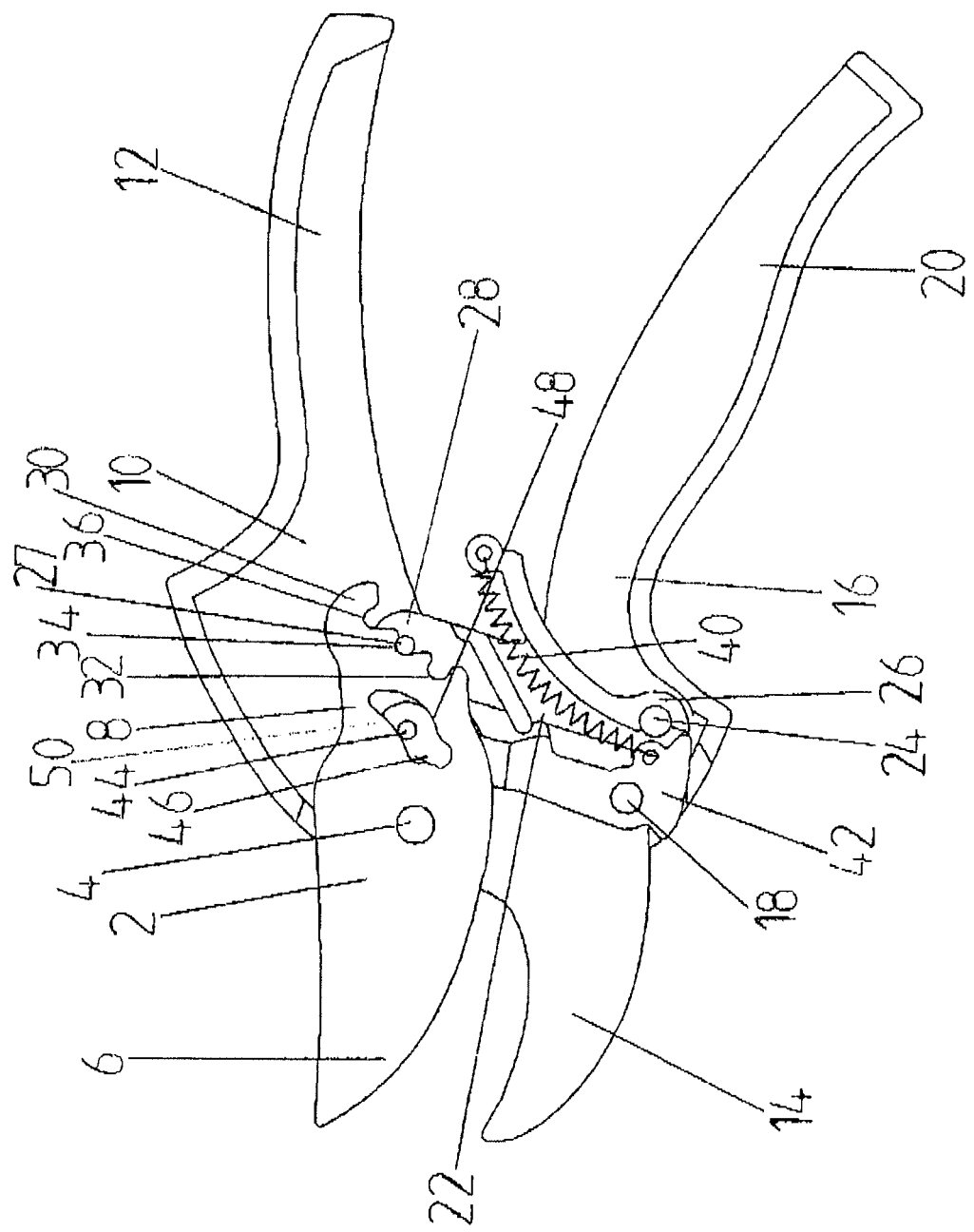
FIG. 3 shows the cutting tool of FIG. 1 in a second open position.

Further, the cutting tool of the invention is arranged to operate such that when an object having a second thickness or diameter, which is larger than the first thickness or diameter, is being cut, the second end 28 of the lever 22 engages with the engagement point 34 second closest to the third pivot point 24 so as to perform a first stepwise cutting movement as shown in FIG. 3. The cutting movement to be performed thereafter cuts a first portion of the thickness or diameter of the object to be cut, when the first and the second handles 12, 20 are shifted towards one another as shown in FIG. 4. When the handles 12, 20 are released, the second end 28 of the lever 22 engages, as shown in FIG. 5, with the engagement point 32 closest to the third pivot point 24 in order to perform a second stepwise cutting movement that cuts a second portion of the thickness or diameter of the object to be cut finalizing the cutting of the object to be cut as shown in FIG. 6.

Further, the cutting tool is arranged to operate such that when an object having a third thickness or diameter, which is larger than the second thickness or diameter, is being cut, the second end 28 of the lever 22 engages with the engagement point 36 third closest to the third pivot point 24 so as to perform a first stepwise cutting movement as shown in FIG. 1. The first cutting movement to be performed thereafter cuts a first portion of the thickness or diameter of the object to be cut, when the first and the second handles 12, 22 are shifted towards one another as shown in FIG. 2. When the handles 12, 20 are released, the second end 28 of the lever 22 engages, as shown in FIG. 4, with the engagement point 34 second closest to the third pivot point 24 so as to perform a second stepwise cutting movement which cuts a second portion of the thickness of the object to be cut, when the first and the second handles 12, 20 are shifted towards one another, as shown in FIG. 4. When the handles 12, 20 are released, the second end 28 of the lever 22 engages, as shown in FIG. 5, with the engagement point 32 closest to the third pivot point 24 so as to perform a third stepwise cutting movement which cuts a third portion of the thickness or diameter of the object to be cut finalizing the cutting of the object to be cut, as shown in FIG. 6.

In accordance with the illustrated embodiment, the cutting tool is arranged to operate such that when an object is being cut, the second end 28 of the lever 22 engages with the engagement point 32, 34, 36 whose distance from the third pivot point 24 corresponds to the thickness of the object to be cut so as to perform a stepwise cutting movement, whereafter in a subsequent cutting movement the second end 28 of the lever 22 engages with the engagement point 32, 34 next closest to the third pivot point 24 in order to perform a next stepwise cutting movement.

In accordance with the above, it should be noted that the number of engagement points may vary from two to several in various applications. Moreover, the above embodiment of the invention represents pruning shears, but the invention may be utilized in other kinds of manually operated cutting tools as well. The illustrated embodiment also shows a cutting tool to be manipulated with one hand, but features of the illustrated embodiment may also be applied to cutting tools intended to be manipulated with two hands such as clearing shears.

It is also important to note that the construction and arrangement of the elements of the cutting tool as shown schematically in the embodiments is illustrative only. Although only a few embodiments have been described in detail in this disclosure, those skilled in the art who review this disclosure will readily appreciate that many modifications are possible without materially departing from the novel teachings and advantages of the subject matter recited.

Accordingly, all such modifications are intended to be included within the scope of the present invention. Other substitutions, modifications, changes and omissions may be made in the design, operating conditions and arrangement of the preferred and other exemplary embodiments without departing from the spirit of the present invention.

The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the present invention as expressed in the appended claims.

What claimed is:

1. A cutting tool comprising:
   a metal plate comprising a first pivot point and a first blade extending forwardly from the first pivot point and a tongue extending backwardly;
   a first elongated element comprising a first handle and comprising at its distal end an anvil or a second blade that is arranged to form with the first blade a cutting jaw, and a second pivot point, the first elongated element being connected in an articulated manner to the metal plate at the first pivot point;

a second elongated element comprising a second handle and a third pivot point, the second elongated element being connected in an articulated manner to the first elongated element at the second pivot point;

a first lever comprising a first end and a second end, the first end being connected in an articulated manner to the second elongated element at the third pivot point and the second end being arranged to engage with the tongue of the metal plate so as to transmit force from the second elongated element to the first blade for performing a cutting movement with the cutting jaw when the first and the second elongated elements are shifted towards one another;

an engagement device provided in the tongue, the engagement device being arranged to receive the second end of the first lever optionally at two or more engagement points in relation to the first pivot point in order to perform stepwise cutting movements, wherein the engagement points are placed in the tongue successively away from the third pivot point; and a control device for engaging the second end of the first lever with the engagement point that corresponds to a diameter or thickness of an object to be cut with each cutting movement at a particular time, wherein the control device comprises a second lever having a first end and a second end, the first end of the second lever being connected to the first elongated element in an articulated manner at the second pivot point and the second end of the second lever being connected to the metal plate.

2. The cutting tool of claim 1, wherein the engagement points are placed in the tongue successively on the line that extends substantially in parallel with the first lever at the end of each cutting movement, or that extends substantially radially in relation to the third pivot point at the end of the cutting movement, or that extends transversely in relation to the line extending radially from the first pivot point towards the engagement points.

3. The cutting tool of claim 1, wherein the engagement points are placed in the tongue successively on the line forming an arc that curves around the first pivot point.

4. The cutting tool of claim 1, wherein the engagement points are placed in the tongue such that an angle between the line extending through the closest engagement point to and the furthest engagement point from the third pivot point and the line extending through the first pivot point and the engagement point closest to the third pivot point is at most approximately 125 degrees at the end of each cutting movement.

5. The cutting tool of claim 1, wherein the engagement points are placed in the tongue such that an angle between the line extending through two adjacent or successive engagement points and the line extending through the first pivot point and the engagement point closest to the third pivot point of the successive engagement points is at most approximately 125 degrees at the end of each cutting movement.

6. The cutting tool of claim 1, wherein the engagement points are provided such that they are substantially at the same distance from the first pivot point at the end of each cutting movement.

7. The cutting tool of claim 1, wherein the engagement points are notches which are arranged to receive optionally a first pin at the second end of the first lever so as to engage the lever with the metal plate and to transmit force from the second elongated element to the first blade.

8. The cutting tool of claim 1, wherein the engagement points are provided on the edge of the tongue in the metal plate.

9. The cutting tool of claim 1, wherein in the tongue of the metal plate there is provided an aperture, through which the first pin at the second end of the first lever is inserted and on the edge of which aperture there are provided the engagement points.

10. The cutting tool of claim 1, wherein the control device is arranged to control the position of the metal plate such that a first pin at the second end of the lever engages with the engagement point that corresponds to the diameter or thickness of the object to be cut with each cutting movement at a particular time.

11. The cutting tool of claim 1, wherein the control device comprises a second pin at the second end of a second lever and that the metal plate comprises an aperture through which the second pin is inserted for controlling the position of the metal plate.

12. The cutting tool of claim 1, wherein the cutting tool further comprises a spring for pretensioning the first and the second handles and the cutting jaw to an open position.

13. The cutting tool of claim 12, wherein in the open position pretensioned with the spring of the first and the second handles, the second end of the lever engages with the engagement point closest to the third pivot point.

14. The cutting tool of claim 12, wherein the spring comprises a spiral spring, which is connected between the first lever and the second lever, or between the first lever and the second elongated element, or between the first lever and the first elongated element.

15. The cutting tool of claim 1, wherein the cutting tool is arranged to operate such that when an object having a first thickness or diameter is being cut, the second end of the lever engages with the engagement point closest to the third pivot point so as to perform a cutting movement that cuts off completely the object to be cut.

16. The cutting tool of claim 1, wherein the cutting tool is arranged to operate such that when an object having a second thickness or diameter, which is larger than a first thickness or diameter, is being cut, the second end of the lever engages with the engagement point second closest to the third pivot point so as to perform a first stepwise cutting movement that cuts a first portion of the thickness or diameter of the object to be cut, whereafter in a subsequent cutting movement the second end of the lever engages with the engagement point closest to the third pivot point in order to perform a second stepwise cutting movement that cuts a second portion of the thickness or diameter of the object to be cut finalizing the cutting of the object to be cut.

17. The cutting tool of claim 1, wherein the cutting tool is arranged to operate such that when an object having a third thickness or diameter, which is larger than a second thickness or diameter, is being cut, the second end of the lever engages with the engagement point third closest to the third pivot point so as to perform a first stepwise cutting movement, which cuts a first portion of the thickness or diameter of the object to be cut, whereafter in a subsequent cutting movement the second end of the lever engages with the engagement point second closest to the third pivot point so as to perform a second stepwise cutting movement, and whereafter in a subsequent cutting movement the second end of the lever engages with the engagement point closest to the third pivot point so as to perform a third stepwise cutting movement which cuts a third portion of the thickness or diameter of the object to be cut finalizing the cutting of the object to be cut.

18. The cutting tool of claim 1, wherein the cutting tool is arranged to operate such that when an object is being cut, the second end of the lever engages with the engagement point whose distance from the third pivot point corresponds to the thickness of the object to be cut for performing a stepwise cutting movement, whereafter in a subsequent cutting movement the second end of the lever engages with the engagement point next closest to the third pivot point so as to perform a next stepwise cutting movement.

19. A cutting tool comprising:
a metal plate comprising a first pivot point and a first cutting element extending forwardly from the first pivot point and a tongue extending backwardly;
a first elongated element comprising a first handle and comprising at its distal end a second cutting element that is arranged to form with the first cutting element a cutting jaw, and a second pivot point, the first elongated element coupled to the metal plate at the first pivot point;
a second elongated element comprising a second handle and a third pivot point, the second elongated element coupled to the first elongated element at the second pivot point; and
a first lever comprising a first end and a second end, the first end being coupled to the second elongated element at the third pivot point and the second end being arranged to engage with the tongue of the metal plate so as to transmit force from the second elongated element to the first blade;
a plurality of spaced engagement points provided in the tongue, the engagement points being arranged to receive the second end of the first lever in order to perform stepwise cutting movements; and
a control device for engaging the second end of the first lever with the engagement point that corresponds to a diameter or thickness of an object to be cut with each cutting movement at a particular time, wherein the control device comprises a second lever having a first end and a second end, the first end of the second lever being connected to the first elongated element in an articulated manner at the second pivot point and the second end of the second lever being connected to the metal plate.

20. A cutting tool comprising:
a metal plate comprising a first pivot point and a first blade extending forwardly from the first pivot point and a tongue extending backwardly;
a first elongated element comprising a first handle and comprising at its distal end an anvil or a second blade that is arranged to form with the first blade a cutting jaw, and a second pivot point, the first elongated element being connected in an articulated manner to the metal plate at the first pivot point;
a second elongated element comprising a second handle and a third pivot point, the second elongated element being connected in an articulated manner to the first elongated element at the second pivot point;
a first lever comprising a first end and a second end, the first end being connected in an articulated manner to the second elongated element at the third pivot point and the second end being arranged to engage with the tongue of the metal plate so as to transmit force from the second elongated element to the first blade for performing a cutting movement with the cutting jaw when the first and the second elongated elements are shifted towards one another;
an engagement device provided in the tongue, the engagement device being arranged to receive the second end of the first lever optionally at two or more engagement points in relation to the first pivot point in order to perform stepwise cutting movements, wherein the engagement points are placed in the tongue successively away from the third pivot point; and
a control device for engaging the second end of the first lever with the engagement point that corresponds to the diameter or thickness of the object to be cut with each cutting movement at a particular time, wherein the control device comprises a second pin at the second end of a second lever and that the metal plate comprises an aperture through which the second pin is inserted for controlling the position of the metal plate; and
wherein the aperture comprises a rear surface which is spiral in relation to the first pivot point and with which the second pin engages for controlling the metal plate as the cutting jaw opens, and/or the aperture comprises a front surface which is spiral in relation to the first pivot point and with which the second pin engages for controlling the metal plate as the cutting jaw closes.

* * * * *